US011148547B2

(12) United States Patent
Nakao et al.

(10) Patent No.: US 11,148,547 B2
(45) Date of Patent: Oct. 19, 2021

(54) VEHICLE-MOUNTABLE CONTROL SYSTEM AND VEHICLE

(71) Applicants: Toyota Jidosha Kabushiki Kaisha, Toyota (JP); DENSO TEN Limited, Kobe (JP)

(72) Inventors: Kenji Nakao, Toyota (JP); Tsuyoshi Hirose, Toyota (JP); Yuho Terai, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 173 days.

(21) Appl. No.: 16/534,160

(22) Filed: Aug. 7, 2019

(65) Prior Publication Data

US 2020/0047637 A1 Feb. 13, 2020

(30) Foreign Application Priority Data

Aug. 9, 2018 (JP) .............................. JP2018-150635

(51) Int. Cl.
*B60L 53/66* (2019.01)
*H04B 5/00* (2006.01)
*B60L 53/126* (2019.01)

(52) U.S. Cl.
CPC ............. *B60L 53/66* (2019.02); *B60L 53/126* (2019.02); *H04B 5/0037* (2013.01)

(58) Field of Classification Search
CPC ........ B60L 53/66; B60L 53/305; B60L 53/62; B60L 53/126; B60L 53/12; B60L 53/14; H04B 5/0037
See application file for complete search history.

(56) References Cited

U.S. PATENT DOCUMENTS

2011/0304298 A1* 12/2011 Gow .................. H02J 1/10
320/107
2012/0043807 A1* 2/2012 Ichikawa ............ B60L 1/003
307/9.1

(Continued)

FOREIGN PATENT DOCUMENTS

JP 2004-280294 A 10/2004
JP 2013-110822 A 6/2013

(Continued)

OTHER PUBLICATIONS

Machine translation of KR-20130136852-A. (Year: 2021).*

*Primary Examiner* — David V Henze-Gongola
(74) *Attorney, Agent, or Firm* — Dinsmore & Shohl LLP

(57) ABSTRACT

A charging control device of a vehicle-mountable control system includes: a plurality of chargers corresponding to respective power feeding methods; a charging communication device configured to communicate with a charging facility external to a vehicle; and an integrated controller configured to communicate with each of the plurality of chargers and the charging communication device. The electric power of the charging facility is supplied to a vehicle-mounted battery through the charger corresponding to the power feeding method of the charging facility. The plurality of chargers, the charging communication device and the integrated controller are connected to one another through a first communication line used only for charging control. Of the plurality of chargers, the charging communication device and the integrated controller, only the integrated controller is connected to a second communication line to which a traveling controller is connected.

7 Claims, 7 Drawing Sheets

(56) References Cited

U.S. PATENT DOCUMENTS

2013/0127409 A1    5/2013   Ichikawa
2013/0193749 A1    8/2013   Nakamura et al.
2015/0008877 A1    1/2015   Ichikawa et al.

FOREIGN PATENT DOCUMENTS

| JP | 2013-126327 | A |   | 6/2013 |
| --- | --- | --- | --- | --- |
| JP | 2013-146148 | A |   | 7/2013 |
| JP | 2013-146154 | A |   | 7/2013 |
| JP | 2013-154815 | A |   | 8/2013 |
| JP | 2015-050891 | A |   | 3/2015 |
| KR | 20130136852 | A | * | 12/2013 |

* cited by examiner

VEHICLE-MOUNTABLE CONTROL SYSTEM AND VEHICLE

CROSS REFERENCE TO RELATED APPLICATIONS

This nonprovisional application claims priority to Japanese Patent Application No. 2018-150635 filed on Aug. 9, 2018 with the Japan Patent Office, the entire contents of which are hereby incorporated by reference.

BACKGROUND

Field

The present disclosure relates to a vehicle-mountable control system and a vehicle, and more particularly to a vehicle-mountable control system and a vehicle configured to be supplied with electric power from outside the vehicle in accordance with a plurality of types of power feeding methods and execute charging control of a vehicle-mounted battery.

Description of the Background Art

In recent years, various power feeding methods such as an AC power wired power feeding method, a DC power wired power feeding method (e.g., a CHAdeMO method, a CCS (Combined Charging System) method and a GB/T method) and a wireless power feeding method (also referred to as "WPT (wireless power transfer) method") have been proposed as a power feeding method for supplying electric power used for charging of a vehicle-mounted battery to a vehicle. For example, Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327 disclose a WPT system configured to wirelessly transfer electric power from a primary coil of a power transmission device to a secondary coil of a power reception device.

In addition, Japanese Patent Laying-Open No. 2004-280294 discloses a vehicle-mounted power supply management device including an integrated controller communicatively connected to a plurality of electrical components and configured to collectively manage power-on and power-off of the respective electrical components.

SUMMARY

Generally, various types of controllers of a powertrain system in a vehicle are connected to a communication bus for the powertrain (hereinafter, also referred to as "powertrain bus"). For example, in a vehicle configured to be supplied with electric power from outside the vehicle in accordance with a plurality of types of power feeding methods and execute charging control of a battery for traveling, charging controllers configured to execute charging control are prepared for the respective power feeding methods, and the plurality of charging controllers corresponding to the respective power feeding methods are in many cases connected to the powertrain bus, together with a traveling controller configured to execute traveling control of the vehicle.

When a charging controller is supplied with electric power from a charging facility external to a vehicle, the charging controller communicates with the charging facility to thereby obtain information for charging (e.g., specifications of the charging facility) from the charging facility and transmit information for power feeding (e.g., power reception condition) to the charging facility. Although security measures corresponding to a communication standard are taken, the possibility of unauthorized information entering the vehicle during communication cannot be denied as long as communication with the outside of the vehicle is performed. In the above-described vehicle, the traveling controller having a higher risk rank is connected to the powertrain bus, and thus, strong security measures are required to prevent unauthorized information from entering the powertrain bus. In addition, in the above-described vehicle, the respective charging controllers corresponding to the respective power feeding methods communicate with the outside of the vehicle, and thus, all of the charging controllers require strong security measures.

However, if many charging controllers are mounted on a vehicle to correspond to many power feeding methods (e.g., three or more types of power feeding methods) and strong security measures are taken on each of the charging controllers, the cost increases significantly.

The present disclosure has been made to solve the above-described problem, and an object of the present disclosure is to provide a vehicle-mountable control system and a vehicle capable of suppressing unauthorized access to a traveling controller caused by unauthorized information, even when the unauthorized information enters the vehicle from outside the vehicle due to communication between the vehicle and a charging facility external to the vehicle.

A vehicle-mountable control system according to the present disclosure includes a traveling controller and a charging control device. The traveling controller is configured to execute traveling control of a vehicle. The charging control device is configured to be supplied with electric power in accordance with a plurality of types of power feeding methods and execute charging control of a vehicle-mounted battery. The charging control device includes: a plurality of chargers corresponding to the respective power feeding methods; a charging communication device configured to communicate with a charging facility external to the vehicle; and an integrated controller configured to communicate with each of the plurality of chargers and the charging communication device. The charging facility is configured to supply electric power to the vehicle-mounted battery through a charger corresponding to a power feeding method of the charging facility. The plurality of chargers, the charging communication device and the integrated controller are connected to one another through a first communication line used only for the charging control. Of the plurality of chargers, the charging communication device and the integrated controller, only the integrated controller is connected to a second communication line to which the traveling controller is connected.

In the above-described vehicle-mountable control system, the charging communication device is configured to communicate with the charging facility (hereinafter, also referred to as "charging stand") external to the vehicle. Thus, the charging communication device can obtain information for charging from the charging stand and transmit information for power feeding to the charging stand. The information obtained from the charging stand by the charging communication device is exchanged through the first communication line (charging-dedicated line). The plurality of chargers corresponding to the respective power feeding methods, the charging communication device and the integrated controller are connected to one another through the first communication line, and thus, can communicate with one another through the first communication line.

When the charging communication device communicates with the charging stand as described above, unauthorized information may in some cases enter the vehicle from outside the vehicle during communication. The unauthorized information may access the charging communication device. The unauthorized information having entered the vehicle may access not only the charging communication device but also each charger and the integrated controller connected to the first communication line.

However, in the above-described vehicle-mountable control system, only the integrated controller, of the charging communication device, the plurality of chargers and the integrated controller connected to the first communication line (charging-dedicated line), is connected to the second communication line to which the traveling controller is connected, and the traveling controller is separated from the charging communication device. Thus, transmission of the unauthorized information can be blocked by the integrated controller and the unauthorized information having entered the vehicle through the charging communication device is less likely to access the traveling controller. Therefore, even when the unauthorized information enters the vehicle from outside the vehicle due to communication between the vehicle and the charging stand, unauthorized access to the traveling controller caused by the unauthorized information can be suppressed. In addition, in the above-described vehicle-mountable control system, the integrated controller is connected to the traveling controller through the second communication line, and thus, a request signal (e.g., a charging request that request the integrated controller for charging) can be transmitted from the traveling controller to the integrated controller. The request signal can also be transmitted from the integrated controller to the traveling controller. The request signal is a signal that requests some kind of process (e.g., transmission of particular information).

Each of the charging communication device and the integrated controller may be configured to monitor presence or absence of unauthorized communication, and perform a prescribed process when the unauthorized communication is detected. Both of the charging communication device and the integrated controller monitor whether or not the unauthorized communication is performed, and thus, an appropriate action can be taken (i.e., the prescribed process can be performed) immediately or reliably when the unauthorized information enters the vehicle due to communication between the vehicle and the charging facility external to the vehicle.

The prescribed process may be a process for suppressing expansion of damage caused by the unauthorized communication, or may be a process for repairing a portion damaged by the unauthorized communication. More specifically, the prescribed process may be at least one of powering off the charging communication device, prohibiting communication through the first communication line, and reprogramming a falsified program.

The integrated controller may be configured to control the plurality of chargers to be individually powered on and off. When the charging control is not executed, the integrated controller may be configured to power off all of the plurality of chargers. When the charging control is executed using electric power supplied in accordance with prescribed power feeding method, the integrated controller may be configured to power on the charger corresponding to the prescribed power feeding method, with the plurality of chargers not corresponding to the prescribed power feeding method being maintained off.

In the above-described configuration, the integrated controller is configured to control the chargers to be individually powered on and off, and thus, the unused chargers can be selectively powered off (brought into a non-conducting state). When the charging control is not executed, all of the chargers are powered off. As a result, power consumption in the vehicle-mounted controllers can be reduced and the unauthorized information is less likely to enter the vehicle due to communication with the charging stand.

The vehicle-mountable control system may further include a display controller configured to control a display device. The display controller may be connected to the integrated controller through the second communication line. The integrated controller may be configured to transmit display information to the display controller, but not transmit information other than a prescribed request signal to the traveling controller.

In the above-described configuration, the information other than the prescribed request signal is not transmitted from the integrated controller to the traveling controller. Thus, even when the unauthorized information enters the vehicle from outside the vehicle due to communication between the vehicle and the charging stand, the possibility of the unauthorized information entering the components (traveling controller side) following the integrated controller that are present between the charging stand and the traveling controller is decreased. On the other hand, the display information (e.g., HMI (Human Machine Interface) display data) is lower in information security risk than a control program. That is, the possibility of the unauthorized access to the traveling controller being caused by the display information is low. By using the second communication line for transmission of such display information, an increase in communication lines can be suppressed.

The plurality of chargers may include a first charger configured to perform power conversion corresponding to a wired power feeding method, and a second charger configured to perform wireless power reception and power conversion corresponding to a wireless power feeding method. The integrated controller may be configured to wiredly communicate with a charging facility for the wired power feeding method provided outside the vehicle. The charging communication device may be configured to wirelessly communicate with a charging facility for the wireless power feeding method provided outside the vehicle.

When comparing the communications in the respective power feeding methods, the wired communication in the wired power feeding method tends to be lower in information security risk (i.e., the unauthorized information is less likely to enter the vehicle), and the wireless communication in the wireless power feeding method tends to be higher in information security risk (i.e., the unauthorized information is more likely to enter the vehicle). In the above-described configuration, the wired communication with the charging stand for the wired power feeding method that is lower in information security risk is performed by the integrated controller. The integrated controller can use the information obtained from the charging stand by the wired communication for the charging control. In addition, the wired communication is lower in information security risk, and thus, the possibility of the unauthorized information entering the vehicle from outside the vehicle during communication is low. On the other hand, the wireless communication with the charging stand for the wireless power feeding method that is higher in information security risk is performed by the charging communication device separated from the traveling controller. Therefore, even if the unauthorized information enters the vehicle from outside the vehicle due to the wireless communication, the unauthorized access to the traveling controller caused by the unauthorized information is less likely to occur. In this way, the above-described configuration can ensure the sufficient security level. In addition, in the above-described configuration, a communication module for the above-described wired communication and a communication module for the above-described wireless communication can be mounted separately in the integrated controller and the charging communication device, and thus, the space for mounting the communication modules is easily ensured.

The vehicle-mountable control system may further include a plurality of global buses communicatively connected to one another via a gateway device. The first communication line may be a local bus communicatively connecting prescribed controllers included in the charging control device, and not connected to the gateway device and the plurality of global buses. The second communication line may be the global bus connected to the gateway device.

By using the above-described local bus as the first communication line (charging-dedicated line), the charging control device can execute the charging control of the vehicle-mounted battery, while exchanging information between the prescribed controllers through the first communication line (local bus). The local bus is separated from each global bus and performs communication within a limited range. By using the above-described global bus as the second communication line, the traveling controller can execute the traveling control of the vehicle based on information obtained from the other global buses and transmit information about traveling to the other global buses, while exchanging information with the other global buses through the second communication line (global bus) and the gateway device.

A vehicle according to the present disclosure includes: the above-described vehicle-mountable control system; the vehicle-mounted battery configured to be charging-controlled by the charging control device of the vehicle-mountable control system; and a travel driving device configured to be controlled by the traveling controller of the vehicle-mountable control system and cause the vehicle to travel using electric power stored in the vehicle-mounted battery.

In the above-described vehicle, even when unauthorized information enters the vehicle from outside the vehicle due to communication between the vehicle and a charging stand during charging of the battery for traveling, unauthorized access to the traveling controller caused by the unauthorized information can be suppressed.

The foregoing and other objects, features, aspects and advantages of the present disclosure will become more apparent from the following detailed description of the present disclosure when taken in conjunction with the accompanying drawings.

DETAILED DESCRIPTION

Figure 1:
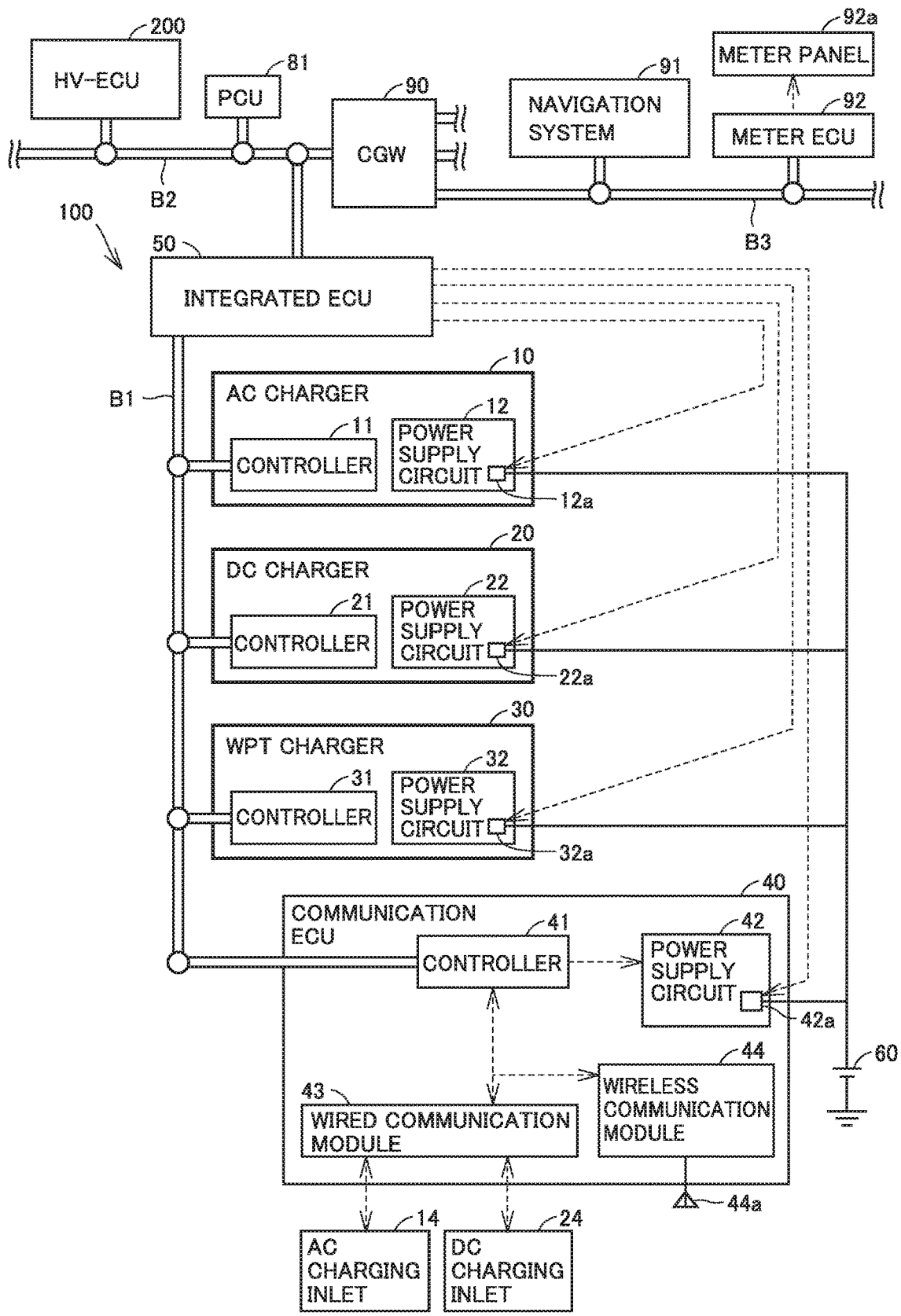
FIG. 1 is an overall configuration diagram of a vehicle-mountable control system according to an embodiment of the present disclosure.

An embodiment of the present disclosure will be described in detail with reference to the drawings, in which the same or corresponding components are denoted by the same reference characters and description thereof will not be repeated.

Hereinafter, description will be given of an example in which a vehicle-mountable control system according to the present embodiment is applied to a hybrid vehicle. However, the applicable range of the vehicle-mountable control system is not limited to the hybrid vehicle and the vehicle-mountable control system may be applied to an electric vehicle not having an engine mounted thereon. Hereinafter, an electronic control unit will be referred to as "ECU".

FIG. 1 is an overall configuration diagram of the vehicle-mountable control system according to the embodiment of the present disclosure. Referring to FIG. 1, the vehicle-mountable control system according to the present embodiment includes a charging control device 100 and an HV (hybrid)-ECU 200. Charging control device 100 is configured to be supplied with electric power in accordance with a plurality of types of power feeding methods and execute charging control of a vehicle-mounted battery (e.g., a driving battery 70 shown in FIG. 2 below). HV-ECU 200 is configured to execute traveling control of the vehicle (e.g., the hybrid vehicle) having this system mounted thereon. HV-ECU 200 according to the present embodiment corresponds to one example of "traveling controller" according to the present disclosure.

Charging control device 100 includes a plurality of chargers (e.g., an AC charger 10, a DC charger 20 and a WPT charger 30) corresponding to the respective power feeding methods, a communication ECU 40 and an integrated ECU 50. Communication ECU 40 is configured to communicate with charging facilities (e.g., an AC charging stand 110, a DC charging stand 120 and a WPT charging stand 130 shown in FIG. 2 below) external to the vehicle. Integrated ECU 50 is configured to communicate with each of AC charger 10, DC charger 20, WPT charger 30, and communication ECU 40. Communication ECU 40 and integrated ECU 50 according to the present embodiment correspond to one example of "charging communication device" and "integrated controller" according to the present disclosure, respectively.

AC charger 10, DC charger 20, WPT charger 30, and communication ECU 40 include controllers 11, 21, 31, and 41, respectively. Each of these controllers 11, 21, 31, and 41, integrated ECU 50 and HV-ECU 200 is configured to include a processor, a memory device, an input/output port, and a communication port (all are not shown). The processor is formed by, for example, a microprocessor including a CPU (Central Processing Unit). The memory device includes a RAM (Random Access Memory) configured to temporarily store data, and a storage (e.g., a ROM (Read Only Memory) and a rewritable nonvolatile memory) configured to save a program and other information. The processor executes the program stored in the memory device and various types of control are thereby executed. The various types of control can be processed not only by software but also by dedicated hardware (electronic circuit). In addition, in the present embodiment, only controller 41 and integrated ECU 50, of controllers 11, 21, 31, and 41 and integrated ECU 50, are provided with security measures software and/or hardware (e.g., a firewall or a secure microcontroller).

The vehicle-mountable control system according to the present embodiment further includes an auxiliary battery 60. Auxiliary battery 60 is a vehicle-mounted battery of a low voltage system (e.g., a 12 V system) and supplies electric power to an auxiliary load mounted on the vehicle. A lead battery can, for example, be used as auxiliary battery 60. However, a secondary battery (e.g., a nickel-metal hydride battery) other than the lead battery may be used as auxiliary battery 60. The auxiliary load is driven by driving power (e.g., electric power having a voltage of approximately 5 V to 12 V) generated using the electric power of auxiliary battery 60. Examples of the auxiliary load include electrical loads such as a lighting device, a wiper device, an audio device, a navigation system 91, a meter panel 92a, and various types of ECUs. Auxiliary battery 60 functions as a power supply configured to start up each controller included in the vehicle-mountable control system.

AC charger 10, DC charger 20, WPT charger 30, and communication ECU 40 include power supply circuits 12, 22, 32, and 42, respectively. Power supply circuits 12, 22, 32, and 42 include switches 12a, 22a, 32a, and 42a controlled to be turned on and off by integrated ECU 50. Integrated ECU 50 and each of switches 12a, 22a, 32a, and 42a are connected by a direct control line (hereinafter, also referred to as "direct line") configured to directly connect the devices one-to-one. By using the direct line for transmission of a control signal, the control speed is increased.

Switches 12a, 22a, 32a, and 42a are power supply switches provided in power supply lines of AC charger 10, DC charger 20, WPT charger 30, and communication ECU 40, respectively. When the power supply switches are on (conducting state), the electric power is supplied from auxiliary battery 60 to controllers 11, 21, 31, and 41. When the power supply switches are turned off (non-conducting state), the electric power is no longer supplied from auxiliary battery 60 to controllers 11, 21, 31, and 41.

Communication ECU 40 further includes a wired communication module 43 and a wireless communication module 44. Each of wired communication module 43 and wireless communication module 44 is controlled by controller 41, performs communication with the outside of the vehicle and outputs a signal received from outside the vehicle to controller 41.

Wired communication module 43 is configured to include a CPLT (control pilot) circuit and a PLC (Power Line Communication) modem (both are not shown) described below.

The CPLT circuit is configured to perform communication (hereinafter, also referred to as "CPLT communication") compliant with a CPLT standard with the prescribed charging stands (e.g., AC charging stand 110 and DC charging stand 120 shown in FIG. 2 below) through a signal line (hereinafter, referred to as "CPLT line") housed in a charging cable. In the CPLT communication, communication is performed using a CPLT signal.

The PLC modem is configured to perform communication in accordance with a PLC method (hereinafter, also referred to as "PLC communication") with the prescribed charging stand (e.g., DC charging stand 120 shown in FIG. 2 below) through the above-described CPLT line. In the PLC communication, communication is performed using a high-frequency signal (signal having a higher frequency than that of the CPLT signal) superimposed on the above-described CPLT signal. A frequency of the high-frequency signal is, for example, 2 MHz to 30 MHz.

Notification of a connection state of the charging cable, possibility or impossibility (permission or prohibition) of electric power supply, a suppliable maximum current value (hereinafter, also simply referred to as "maximum current value"), presence or absence of a failure, and the like is provided from the charging stands to the vehicle through the CPLT line. Notification of a request to start/stop power feeding, a power reception condition and the like is provided from the vehicle to the charging stands through the CPLT line.

For example, when the vehicle and the charging stand are connected through the charging cable, the above-described CPLT circuit on the vehicle side and a circuit (not shown) on the charging stand side are connected through the CPLT line in the charging cable to thereby form one circuit. As a result, a voltage of the CPLT signal that is about 12 V in a charging cable non-connection state (state A) drops to about 9 V in a charging cable connection state (state B). Based on such change in voltage (voltage drop) of the CPLT signal, the charging stand can detect that the charging cable has been connected to the vehicle. When connection of the charging cable is insufficient, the charging stand cannot permit output of the electric power (i.e., power feeding) to the vehicle.

When the charging stand detects that the charging cable has been connected to the vehicle as described above, the charging stand generates the CPLT signal indicating the maximum current value, and transmits the CPLT signal to the vehicle. More specifically, the charging stand generates a square wave-shaped PWM (Pulse Width Modulation) signal having a frequency of 1 kHz with an oscillation circuit (not shown), and transmits the PWM signal to the vehicle. The charging stand sets a duty ratio (ratio of a pulse width to a cycle) of the PWM signal at a value corresponding to the maximum current value, to thereby notify the vehicle of the maximum current value. In addition, when the vehicle receives the above-described PWM signal as the CPLT signal, the vehicle can determine that the vehicle and the charging stand have been connected through the charging cable.

Wireless communication module 44 is a communication module for performing wireless communication. Examples of wireless communication module 44 include a WiFi (registered trademark) module configured to perform wireless communication compliant with the communication standard IEEE802.11. Wireless communication module 44 includes an antenna 44a (e.g., a WiFi (registered trademark) antenna). Communication ECU 40 can access an access point of a prescribed network (e.g., a wireless LAN (Local Area Network)) with wireless communication module 44, to thereby perform wireless communication with another communication device (e.g., WPT charging stand 130 shown in FIG. 2 below) connected to the network.

The vehicle-mountable control system according to the present embodiment further includes a CGW (central gateway) 90, a local bus B1 and a global bus B2. Local bus B1 is a charging-dedicated line used only for the charging control. Global bus B2 is a communication bus (powertrain bus) for the powertrain connected to CGW 90. Each of local bus B1 and global bus B2 is, for example, a CAN (Controller Area Network) bus. Local bus B1, global bus B2 and CGW 90 according to the present embodiment correspond to one example of "first communication line", "second communication line" and "gateway device" according to the present disclosure, respectively.

Global buses (hereinafter, also referred to as "other global buses") other than global bus B2 are also connected to CGW 90. These global buses are communicatively connected to one another via CGW 90. Global bus B2 is connected to the other global buses (e.g., a body system global bus, a safety system global bus, an information system global bus, and a diagnostic system global bus) via CGW 90. Each global bus connected to CGW 90 forms a vehicle-mounted LAN for each system. CGW 90 is configured to have a relay function (e.g., a function of performing sequential relay, cycle conversion relay and data recombination relay) and relay a message between the global buses. On the other hand, local bus B1 is not connected to CGW 90 and the global buses (global bus B2 and the other global buses) connected to CGW 90, and communicatively connects the prescribed controllers (e.g., controllers 11, 21, 31, and 41 and integrated ECU 50) included in charging control device 100. Charging control device 100 can execute the charging control of the vehicle-mounted battery (in the present embodiment, driving battery 70 shown in FIG. 2 below), while exchanging information between the above-described controllers (i.e., controllers 11, 21, 31, and 41 and integrated ECU 50) through local bus B1.

HV-ECU 200, integrated ECU 50 and a PCU (Power Control Unit) 81 (more particularly, a controller of PCU 81) are connected to global bus B2. HV-ECU 200 can execute the traveling control of the vehicle based on information obtained from the other global buses and transmit information about traveling to the other global buses, while exchanging information with the other global buses through global bus B2 and CGW 90. In the present embodiment, only integrated ECU 50, of AC charger 10, DC charger 20, WPT charger 30, communication ECU 40, and integrated ECU 50, is connected to global bus B2. HV-ECU 200 can transmit the information to integrated ECU 50 through global bus B2. In addition, HV-ECU 200 can control PCU 81 through global bus B2. The details of PCU 81 will be described below (see FIG. 2).

An HMI controller is connected to a global bus B3 which is one of the other global buses. In the present embodiment, navigation system 91 (more particularly, a controller of navigation system 91) and a meter ECU 92 are connected to global bus B3 as the HMI controller.

Navigation system 91 includes a controller configured to include a processor (e.g., a CPU), a storage device (e.g., a hard disk) configured to retain a control program and a map database, a GPS module configured to receive a signal from a GPS (Global Positioning System) satellite, and a display device (e.g., a touch panel) configured to display a map and other information. The controller of navigation system 91 is configured to perform route search for finding an optimum route (e.g., a shortest route) from a current position of the vehicle to a destination by using the information stored in the storage device and the information obtained by the GPS module, and allow the display device to display the map indicating the optimum route found by route search.

Meter ECU 92 is configured to include a processor (e.g., a CPU) and is configured to control meter panel 92a (display device) configured to display the information about the vehicle (e.g., a current state of the vehicle). Various types of meters (e.g., a speed meter) of the vehicle, a state of the vehicle (e.g., an SOC (State of Charge) of the vehicle-mounted battery) estimated using detection values of various sensors, and a warning lamp (e.g., a lamp turned on when a prescribed warning condition is satisfied) are, for example, displayed on meter panel 92a.

In the present embodiment, the above-described HMI controller (i.e., the controller of navigation system 91 and meter ECU 92) is connected to integrated ECU 50 through global buses B2 and B3 and CGW 90. Integrated ECU 50 is configured to transmit display information (i.e., data for display on the display device) to the above-described HMI controller, but not transmit information other than a prescribed request signal to HV-ECU 200. Each of the controller of navigation system 91 and meter ECU 92 according to the present embodiment corresponds to one example of "display controller" according to the present disclosure.

Figure 2:
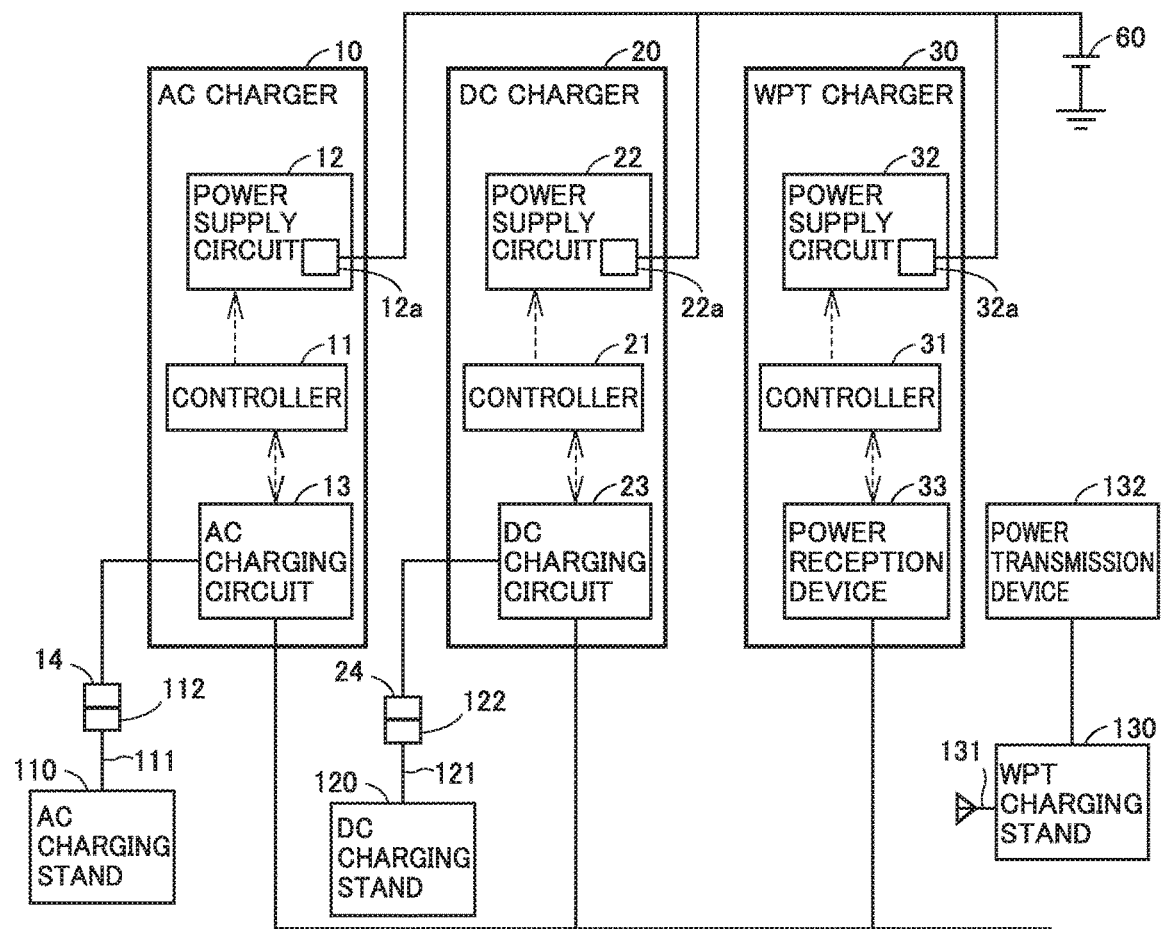
FIG. 2 shows a configuration (particularly, a charging path of a vehicle-mounted battery) of a vehicle according to the embodiment of the present disclosure.
Figure 2:
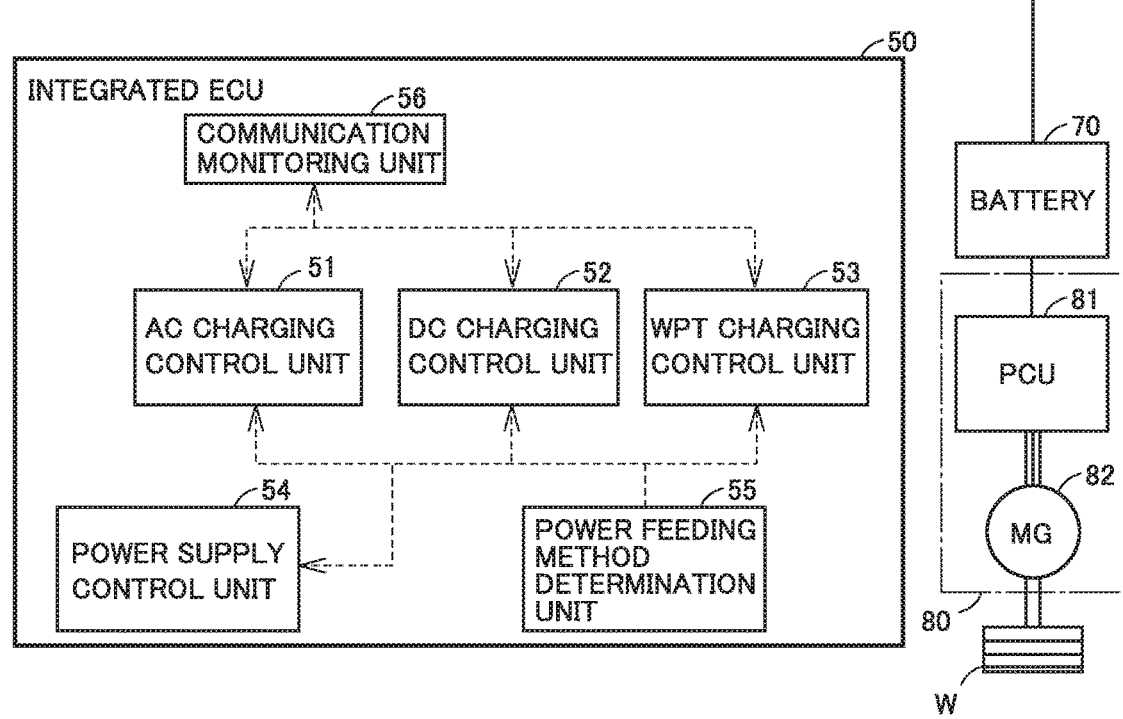

FIG. 2 shows a configuration (particularly, a charging path of the vehicle-mounted battery) of the vehicle (i.e., the vehicle including the vehicle-mountable control system shown in FIG. 1) according to the present embodiment, together with the charging stands.

Referring to FIG. 2 together with FIG. 1, the vehicle further includes driving battery 70, a travel driving device 80 and a driving wheel W, in addition to charging control device 100, CGW 90, various devices connected to global buses B2 and B3, and auxiliary battery 60 shown in FIG. 1. Travel driving device 80 includes PCU (Power Control Unit) 81 and an MG (Motor Generator) 82, and is configured to cause the vehicle to travel using electric power stored in driving battery 70. Travel driving device 80 is controlled by HV-ECU 200. Driving battery 70 is a vehicle-mounted battery configured to be charging-controlled by charging control device 100. Driving battery 70 according to the present embodiment corresponds to one example of "vehicle-mounted battery" according to the present disclosure. Although not shown, the vehicle further includes an internal combustion engine (hereinafter, referred to as "engine"). The vehicle according to the present embodiment is a hybrid vehicle that can travel using both of the electric power stored in driving battery 70 and an output of the engine (not shown). At least a part of the kinetic energy generated by the engine is used to drive driving wheel W. In addition to a motor generator for traveling described below, MG 82 may include a motor generator for power generation configured to generate electric power using the kinetic energy generated by the engine.

Driving battery 70 is configured to include a secondary battery such as a lithium ion battery or a nickel-metal hydride battery, a charging relay controlled to be turned on and off by integrated ECU 50, an SMR (system main relay) controlled to be turned on and off by HV-ECU 200, and a monitoring device configured to monitor a state of driving battery 70 (all are not shown). The monitoring device includes various sensors configured to detect the state (e.g., a temperature, a current and a voltage) of driving battery 70, and outputs a result of detection. The charging relay is turned on (brought into a conducting state) when driving battery 70 is charged. The SMR is turned on (brought into a conducting state) when the vehicle travels using the electric power of driving battery 70. The result of detection by the monitoring device (i.e., the detection values of various sensors) is input to HV-ECU 200, and HV-ECU 200 obtains the state (e.g., the SOC (State of Charge)) of driving battery 70 based on the output of the monitoring device. The state of driving battery 70 is output from HV-ECU 200 to integrated ECU 50 in accordance with the request signal from integrated ECU 50. A state of the SMR is also output from HV-ECU 200 to integrated ECU 50 in accordance with the request signal from integrated ECU 50.

Driving battery 70 supplies electric power for driving driving wheel W by MG 82 to PCU 81. MG 82 is, for example, a motor generator for traveling. A three-phase AC motor generator can be used as the motor generator for traveling. MG 82 is driven by PCU 81 and rotates driving wheel W. MG 82 can also perform regenerative power generation during braking of the vehicle. PCU 81 is configured to include a controller configured to include a processor (e.g., a CPU), an inverter and a converter (all are not shown). The controller of PCU 81 receives an instruction (control signal) from HV-ECU 200 through global bus B2 and controls the inverter and the converter of PCU 81 in accordance with the instruction. During power running driving of MG 82, PCU 81 converts the electric power stored in driving battery 70 to AC power and supplies the AC power to MG 82. During power generation by MG 82, PCU 81 rectifies the generated electric power and supplies the rectified electric power to driving battery 70. The operation of MG 82 and the engine (not shown) is cooperatively controlled by HV-ECU 200 to become an appropriate operation depending on the condition of the vehicle. The number of the motor generators included in MG 82 is not limited to one and a plurality of (e.g., two) motor generators may be included in MG 82.

Various sensors (e.g., a vehicle speed sensor) configured to detect the state of the vehicle may be provided. The detected state of the vehicle is input to, for example, HV-ECU 200 and is output from HV-ECU 200 to integrated ECU 50 in accordance with the request signal from integrated ECU 50.

Generally, the charging stands are roughly divided into a normal charger, a quick charger and a wireless charger. The normal charger is a charging stand for the AC power wired power feeding method (hereinafter, also referred to as "AC method") and can be placed in a house at low cost. The typical normal charger is configured to include a single-phase AC power supply having a voltage of 200 V or 100 V and output AC power.

The quick charger is a charging stand for the DC power wired power feeding method (hereinafter, also referred to as "DC method"), and the time required for charging of a power storage device (e.g., a vehicle-mounted battery) is short. The typical quick charger is configured to include a three-phase AC power supply having a voltage of 200 V, and convert AC power supplied from the power supply to DC power and output the DC power. Recently, a quick charger having a great maximum output (e.g., a maximum output exceeding 100 kW) has also emerged.

The above-described normal charger and quick charger are charging stands for the wired power feeding method configured to supply the electric power from the power supply external to the vehicle to the vehicle through the charging cable. On the other hand, the wireless charger is a charging stand for the wireless power feeding method (hereinafter, also referred to as "WPT method") configured to wirelessly transfer electric power. In the present embodiment, AC charging stand 110 corresponds to the normal charger, DC charging stand 120 corresponds to the quick charger, and WPT charging stand 130 corresponds to the wireless charger. In the present embodiment, DC charging stand 120 corresponds to a DC charging stand for the CCS method. However, the power feeding method of the DC charging stand is not limited to the CCS method and may be the CHAdeMO method. WPT charging stand 130 includes an antenna 131 configured to perform wireless communication (e.g., wireless communication by WiFi (registered trademark)), and a power transmission device 132 including a power transmission coil (not shown). Power transmission device 132 is placed on, for example, a ground surface of a parking lot.

AC charger 10 is a vehicle-mounted charger corresponding to the power feeding method (i.e., the AC method) of AC charging stand 110, and further includes an AC charging circuit 13 in addition to controller 11 and power supply circuit 12 shown in FIG. 1. AC charging circuit 13 includes, for example, a filter circuit, a rectifying circuit, and various sensors configured to detect a state (e.g., a temperature, a current and a voltage) of each portion (all are not shown). A result of detection by the sensors indicating the state of each portion in AC charging circuit 13 is output to controller 11 and is further transmitted from controller 11 to integrated ECU 50 through local bus B1. Controller 11 receives an instruction (control signal) from integrated ECU 50 through local bus B1 and controls AC charging circuit 13 in accordance with the instruction. When a prescribed charging condition is satisfied in a state where an AC charging connector 112 of a charging cable 111 connected to AC charging stand 110 is in connection with an AC charging inlet 14 of the vehicle, AC charger 10 is started up by integrated ECU 50 and charges driving battery 70 with the electric power supplied from AC charging stand 110 through charging cable 111 (more particularly, a power line in the cable). During charging of driving battery 70 by AC charging stand 110, the electric power of AC charging stand 110 is supplied to driving battery 70 through AC charger 10.

DC charger 20 is a vehicle-mounted charger corresponding to the power feeding method (i.e., the DC method) of DC charging stand 120, and further includes a DC charging circuit 23 in addition to controller 21 and power supply circuit 22 shown in FIG. 1. DC charging circuit 23 includes, for example, a filter circuit, and various sensors configured to detect a state (e.g., a temperature, a current and a voltage) of each portion (all are not shown). A result of detection by the sensors indicating the state of each portion in DC charging circuit 23 is output to controller 21 and is further transmitted from controller 21 to integrated ECU 50 through local bus B1. Controller 21 receives an instruction (control signal) from integrated ECU 50 through local bus B1 and controls DC charging circuit 23 in accordance with the instruction. When a prescribed charging condition is satisfied in a state where a DC charging connector 122 of a charging cable 121 connected to DC charging stand 120 is in connection with a DC charging inlet 24 of the vehicle, DC charger 20 is started up by integrated ECU 50 and charges driving battery 70 with the electric power supplied from DC charging stand 120 through charging cable 121 (more particularly, a power line in the cable). During charging of driving battery 70 by DC charging stand 120, the electric power of DC charging stand 120 is supplied to driving battery 70 through DC charger 20.

Each of charging cables 111 and 121 includes therein the signal line (e.g., the CPLT line) and the power line. When AC charging connector 112 of charging cable 111 is connected to AC charging inlet 14 of the vehicle, the power line of charging cable 111 is connected to AC charging circuit 13 and the signal line of charging cable 111 is connected to wired communication module 43 of communication ECU 40. When DC charging connector 122 of charging cable 121 is connected to DC charging inlet 24 of the vehicle, the power line of charging cable 121 is connected to DC charging circuit 23 and the signal line of charging cable 121 is connected to wired communication module 43 of communication ECU 40. The electric power is supplied through the power lines. The information is exchanged through the signal lines. Each of charging cables 111 and 121 may be a vehicle-mounted cable, or may be a cable attached to the charging stand. In addition, each of charging cables 111 and 121 may include a CCID (Charging Circuit Interrupt Device) box and an electric leakage protection device.

WPT charger 30 is a vehicle-mounted charger corresponding to the power feeding method (i.e., the WPT method) of WPT charging stand 130, and further includes a power reception device 33 in addition to controller 31 and power supply circuit 32 shown in FIG. 1. Power reception device 33 includes, for example, a power reception coil, a filter circuit, a rectifying circuit, and various sensors configured to detect a state (e.g., a temperature, a current and a voltage) of each portion (all are not shown). A result of detection by the sensors indicating the state of each portion in power reception device 33 is output to controller 31 and is further transmitted from controller 31 to integrated ECU 50 through local bus B11. Controller 31 receives an instruction (control signal) from integrated ECU 50 through local bus B1 and controls power reception device 33 in accordance with the instruction. When a prescribed charging condition is satisfied in a state where connection of wireless communication between wireless communication module 44 of the vehicle and WPT charging stand 130 is established, WPT charger 30 is started up by integrated ECU 50 and charges driving battery 70 with the electric power wirelessly transmitted from WPT charging stand 130. During charging of driving battery 70 by WPT charging stand 130, the electric power of WPT charging stand 130 is supplied to driving battery 70 through WPT charger 30.

Integrated ECU 50 includes an AC charging control unit 51, a DC charging control unit 52, a WPT charging control unit 53, a power supply control unit 54, a power feeding method determination unit 55, and a communication monitoring unit 56. In integrated ECU 50, each of AC charging control unit 51, DC charging control unit 52, WPT charging control unit 53, power supply control unit 54, power feeding method determination unit 55, and communication monitoring unit 56 is implemented by, for example, a processor and a program executed by the processor.

AC charging control unit 51 is configured to communicate with controller 11 of AC charger 10 through local bus B1 to thereby control charging of driving battery 70 with the electric power supplied from AC charging stand 110. DC charging control unit 52 is configured to communicate with controller 21 of DC charger 20 through local bus B1 to thereby control charging of driving battery 70 with the electric power supplied from DC charging stand 120. WPT charging control unit 53 is configured to communicate with controller 31 of WPT charger 30 through local bus B1 to thereby control charging of driving battery 70 with the electric power supplied from WPT charging stand 130.

Power supply control unit 54 is configured to control switches 12a, 22a, 32a, and 42a to be turned on and off through the above-described direct line to thereby control the vehicle-mounted chargers (AC charger 10, DC charger 20 and WPT charger 30) and communication ECU 40 to be individually powered on and off.

Power feeding method determination unit 55 is configured to determine the power feeding method before the start of power feeding. Power feeding method determination unit 55 determines which of the AC method, the DC method and the WPT method is used for power feeding, based on, for example, information obtained by communication with the charging stand. However, determination by power feeding method determination unit 55 is not limited thereto and power feeding method determination unit 55 may automatically determine the power feeding method without depending on communication with the charging stand. For example, each of AC charging inlet 14 and DC charging inlet 24 may be provided with a mechanical switch pressed when the charging connector is connected, and when the mechanical switch is pressed, a signal indicating that the mechanical switch is pressed may be input to power feeding method determination unit 55. With such a configuration, when the charging connector is connected to AC charging inlet 14, power feeding method determination unit 55 can determine that the power feeding method is the AC method, and when the charging connector is connected to DC charging inlet 24, power feeding method determination unit 55 can determine that the power feeding method is the DC method. In addition, power feeding method determination unit 55 may include an antenna configured to receive a weak signal (e.g., a broadcast signal) emitted from the charging stand for the WPT method. When the antenna receives the weak signal, power feeding method determination unit 55 can determine that the power feeding method is the WPT method. The power feeding method may also be determined based on a user's input (selection of the power feeding method).

Communication monitoring unit 56 is configured to monitor the presence or absence of unauthorized communication by using a prescribed method, and perform a prescribed process when the unauthorized communication is detected. Communication monitoring unit 56 is configured to detect the unauthorized communication in cooperation with, for example, at least one of a firewall and an error detection function of CAN communication (communication through local bus B1). At least one of a process for suppressing expansion of damage caused by the unauthorized communication and a process for repairing a portion damaged by the unauthorized communication can, for example, be used as the process performed when the unauthorized communication is detected. The details of the operation of communication monitoring unit 56 will be described below (see FIG. 6).

Although not shown, controller 41 of communication ECU 40 shown in FIG. 1 also has a communication monitoring unit similar to communication monitoring unit 56. That is, controller 41 is also configured to monitor the presence or absence of unauthorized communication, and perform a prescribed process when the unauthorized communication is detected.

It is also conceivable to modify the configuration shown in FIG. 1 such that communication ECU 40 and integrated ECU 50 are omitted from the system shown in FIG. 1, and three types of vehicle-mounted chargers (AC charger 10, DC charger 20 and WPT charger 30) corresponding to the respective power feeding methods are directly connected to global bus B2 (powertrain bus) and each of these three types of vehicle-mounted chargers communicates with the outside of the vehicle. In such a modified configuration, the three types of vehicle-mounted chargers that communicate with the outside of the vehicle are connected to global bus B2, together with HV-ECU 200 (traveling controller). Therefore, when unauthorized information enters the vehicle during communication between each vehicle-mounted charger and the outside of the vehicle, unauthorized access to HV-ECU 200 may occur. When the unauthorized access to HV-ECU 200 occurs, traveling of the vehicle may be blocked, and in the worst case, the vehicle may stop. Therefore, in the above-described modified configuration, strong security measures (e.g., security enhancement using a firewall) are requested for each of the three types of vehicle-mounted chargers in order to suppress the unauthorized access to HV-ECU 200. However, if strong security measures are taken on each of the three types of vehicle-mounted chargers, the cost increases significantly.

Thus, in the vehicle-mountable control system according to the present embodiment (see FIG. 1), charging control device 100 further includes communication ECU 40 configured to communicate with the charging facilities external to the vehicle, and integrated ECU 50 configured to communicate with each of the three types of vehicle-mounted chargers corresponding to the respective power feeding methods and communication ECU 40, in addition to the above-described three types of vehicle-mounted chargers.

The three types of vehicle-mounted chargers, communication ECU 40 and integrated ECU 50 are connected to one another through local bus B1 (first communication line) used only for the charging control of the vehicle-mounted battery (in the present embodiment, driving battery 70). Therefore, the three types of vehicle-mounted chargers, communication ECU 40 and integrated ECU 50 can communicate with one another through local bus B1.

In addition, in the vehicle-mountable control system according to the present embodiment, only integrated ECU 50, of the three types of vehicle-mounted chargers, communication ECU 40 and integrated ECU 50, is connected to global bus B2 (second communication line) to which HV-ECU 200 (traveling controller) is connected. Since HV-ECU 200 is separated from communication ECU 40 as described above, transmission of the unauthorized information can be blocked by integrated ECU 50 and the unauthorized information having entered the vehicle through communication ECU 40 is less likely to access HV-ECU 200. Therefore, even when the unauthorized information enters the vehicle from outside the vehicle due to communication between the vehicle and the charging stand, the unauthorized access to HV-ECU 200 caused by the unauthorized information can be suppressed.

In the vehicle-mountable control system according to the present embodiment, only communication ECU 40 communicates with the charging stand, and thus, the sufficient security level can be ensured even when strong security measures are not taken on each of the three types of vehicle-mounted chargers. Although strong security measures may be taken on only communication ECU 40, security measures are taken on each of communication ECU 40 and integrated ECU 50 to thereby achieve multi-layer protection in the present embodiment. Such multi-layer protection makes it possible to take an appropriate action immediately or reliably when the unauthorized information enters the vehicle through communication ECU 40. In addition, the multi-layer protection decreases the security level of the security measures requested in each of communication ECU 40 and integrated ECU 50, and thus, the high security level can be ensured at low cost.

In the vehicle-mountable control system according to the present embodiment, integrated ECU 50 is connected to HV-ECU 200 through global bus B2, and thus, the request signal (e.g., the charging request) can be transmitted from HV-ECU 200 to integrated ECU 50. In addition, only the prescribed request signal can be transmitted from integrated ECU 50 to HV-ECU 200. That is, the information other than the prescribed request signal is not transmitted from integrated ECU 50 to H V-ECU 200. Thus, the possibility that the unauthorized information having entered the vehicle through communication ECU 40 enters the HV-ECU 200 side with respect to integrated ECU 50 is decreased. On the other hand, the display information is transmitted from integrated ECU 50 to the display controller (e.g., the controller of navigation system 91 and meter ECU 92). By using global bus B2 for transmission of the display information that is less likely to cause the unauthorized access to HV-ECU 200 (traveling controller), an increase in communication lines can be suppressed.

Figure 3:
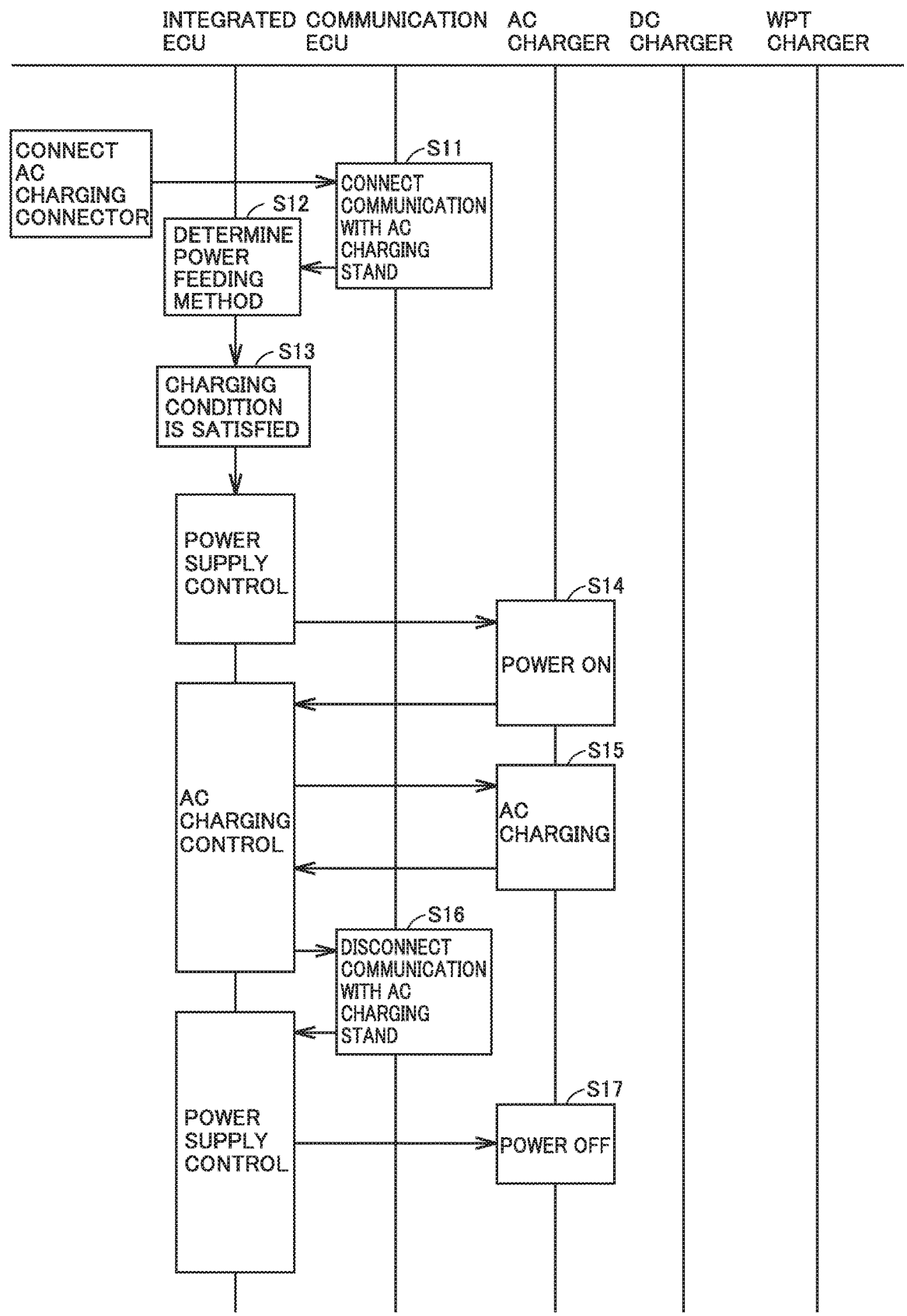
FIG. 3 shows a process procedure of charging control when a vehicle-mounted battery is charged with electric power supplied in accordance with an AC method (AC power wired power feeding method) in the vehicle-mountable control system according to the embodiment of the present disclosure.
Figure 4:
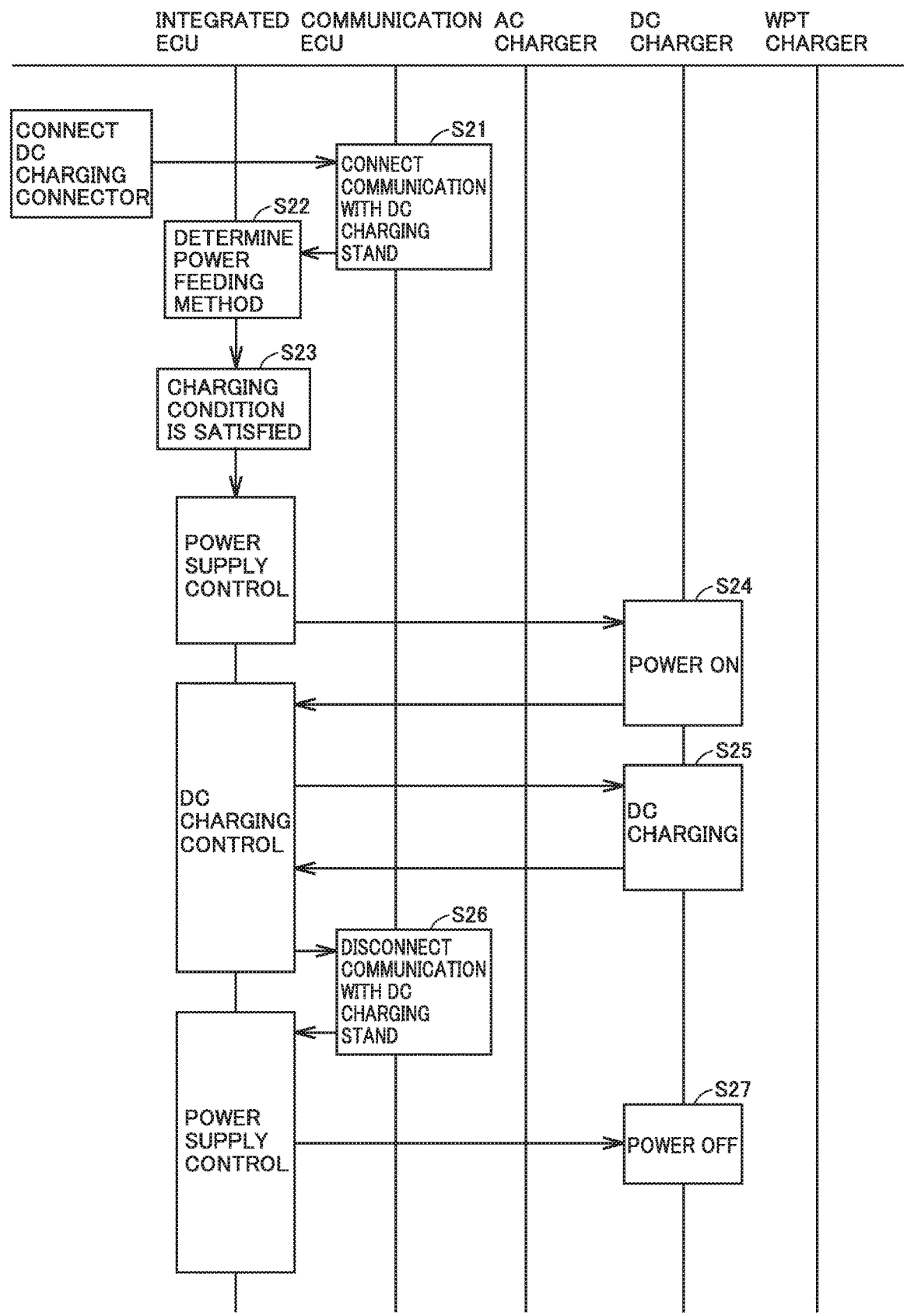
FIG. 4 shows a process procedure of charging control when the vehicle-mounted battery is charged with electric power supplied in accordance with a DC method (DC power wired power feeding method) in the vehicle-mountable control system according to the embodiment of the present disclosure.
Figure 5:
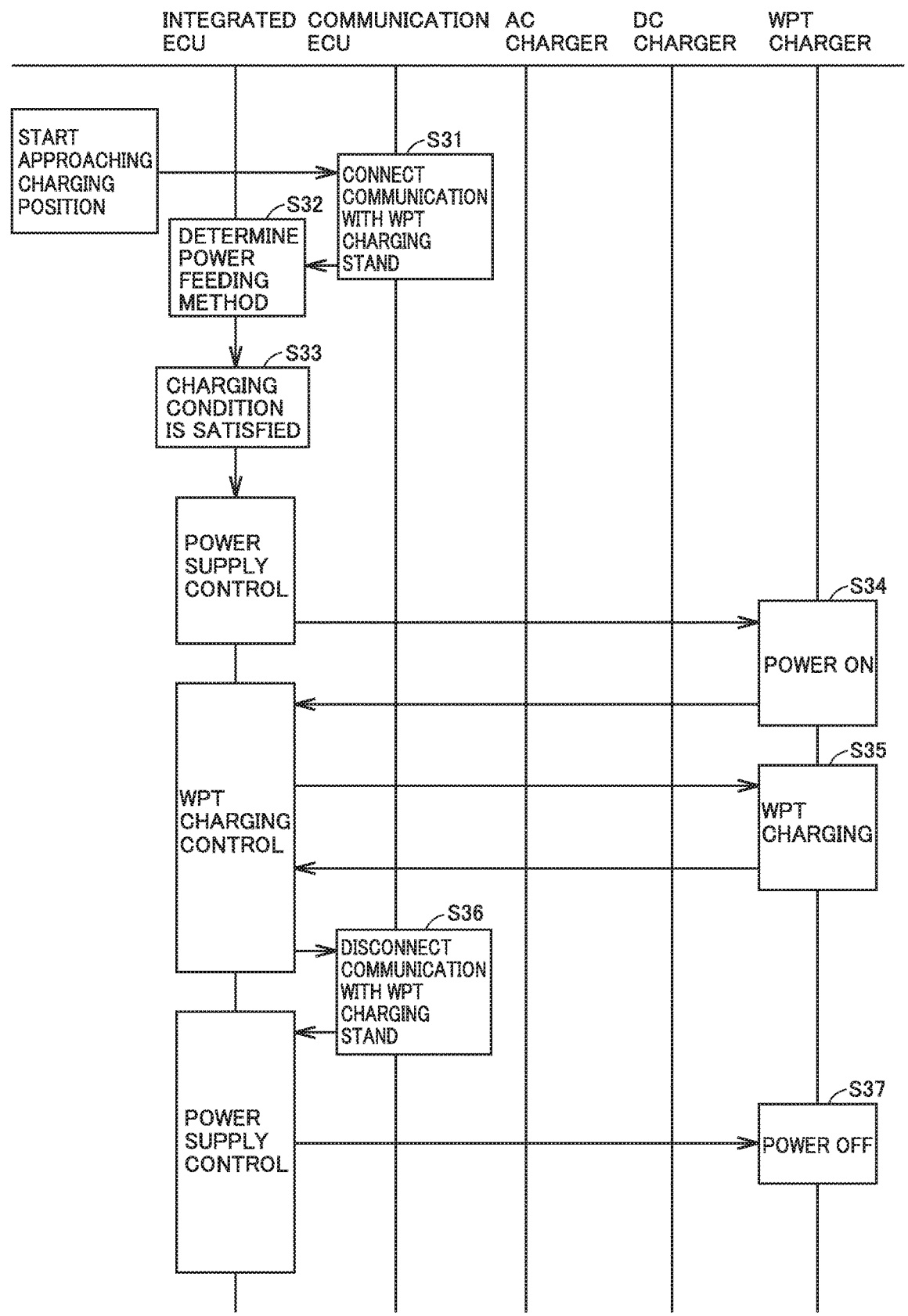
FIG. 5 shows a process procedure of charging control when the vehicle-mounted battery is charged with electric power supplied in accordance with a WPT method (wireless power feeding method) in the vehicle-mountable control system according to the embodiment of the present disclosure.

The charging control of driving battery 70 by the vehicle-mountable control system according to the present embodiment will be described below with reference to FIGS. 3 to 5. When the processes shown in FIGS. 3 to 5 are started, all of the three types of vehicle-mounted chargers (AC charger 10, DC charger 20 and WPT charger 30) are off (non-conducting state). The information transmitted from the charging stand (more particularly, AC charging stand 110, DC charging stand 120 or WPT charging stand 130) to the vehicle is received by wired communication module 43 or wireless communication module 44 of communication ECU 40 and is output to controller 41. Communication among integrated ECU 50, controllers 11, 21 and 31 of the respective chargers and controller 41 of communication ECU 40 is performed through local bus B1. The information received from the charging stand by communication ECU 40 is transmitted from controller 41 of communication ECU 40 to integrated ECU 50 through local bus B1, in accordance with the request signal from integrated ECU 50.

FIG. 3 shows a process procedure of charging control when driving battery 70 is charged with electric power (more particularly, AC power) supplied from AC charging stand 110. The process shown in FIG. 3 includes steps S11 to S17 (hereinafter, simply referred to as "SI 1" to "S17").

Referring to FIG. 3 together with FIGS. 1 and 2, prior to the start of power feeding, a user (e.g., a driver of the vehicle) parks the vehicle near AC charging stand 110 and connects AC charging connector 112 of charging cable 111 connected to AC charging stand 110 to AC charging inlet 14 of the vehicle. When AC charging connector 112 is connected to AC charging inlet 14, controller 41 of communication ECU 40 controls wired communication module 43 to thereby establish connection of communication (more particularly, CPLT communication by charging cable 111) between AC charging stand 110 and communication ECU 40 (SI 1). As a result, the communication between AC charging stand 110 and communication ECU 40 (and further, integrated ECU 50) becomes possible.

Then, integrated ECU 50 receives information indicating the power feeding method from AC charging stand 110. Based on the information received from AC charging stand 110, power feeding method determination unit 55 of integrated ECU 50 determines that the power feeding method is the AC method (S12).

Then, AC charging control unit 51 corresponding to the power feeding method determined by power feeding method determination unit 55 determines whether or not a prescribed charging condition is satisfied (S13). The charging condition can be arbitrarily set. For example, the charging condition may be satisfied when the vehicle is parked and the user or HV-ECU 200 issues the charging request to AC charging stand 110. Alternatively, the charging condition may be satisfied when the vehicle is parked and the preset charging start time comes. Whether or not the vehicle is parked can be determined based on, for example, a state of an ignition switch (not shown) and/or a vehicle speed.

The determination in S13 above is repeatedly performed until the charging condition is satisfied. However, when the charging condition is not satisfied even after the prescribed period of time elapses from initial performance of S13, or when a request signal to stop charging is received from the user, AC charging control unit 51 stops charging.

When AC charging control unit 51 determines that the charging condition is satisfied, power supply control unit 54 turns on switch 12a (brings switch 12a into a conducting state) (S14). As a result, AC charger 10 is powered on and controller 11 of AC charger 10 starts up. Then, AC charger 10 turns on the charging relay (not shown) of driving battery 70 (brings the charging relay of driving battery 70 into a conducting state) and executes charging of driving battery 70 (S15). More specifically, controller 11 of AC charger 10 controls AC charging circuit 13 in accordance with the instruction from integrated ECU 50. AC charging circuit 13 receives the AC power supplied from AC charging stand 110 and performs prescribed power conversion. In the present embodiment, AC charging circuit 13 performs filtering (e.g., noise removal) and rectification of the received AC power, and outputs the obtained DC power to driving battery 70. As a result, driving battery 70 is charged.

Charging executed in S15 above continues until a prescribed completion condition is satisfied, and ends when the completion condition is satisfied. The completion condition is satisfied, for example, when the SOC of driving battery 70 becomes higher than a prescribed SOC value during charging. The prescribed SOC value may, for example, be automatically set by AC charging control unit 51, or may be set by the user.

The completion condition is not limited to the foregoing and can be arbitrarily set. For example, the completion condition may be satisfied when the charging time (i.e., the time that elapses from the start of charging) becomes longer than a prescribed value. Alternatively, the completion condition may be satisfied when an instruction to stop charging is received from the user during charging.

When charging in S15 ends, controller 41 of communication ECU 40 controls wired communication module 43 to thereby disconnect the communication with AC charging stand 110 (S16). Then, power supply control unit 54 turns off switch 12a (brings switch 12a into a non-conducting state) (S17). As a result, AC charger 10 is powered off and controller 11 of AC charger 10 stops. Thereafter, AC charging control unit 51 turns off the charging relay (not shown) of driving battery 70 (brings the charging relay of driving battery 70 into a blocked state) and ends the charging control of driving battery 70.

FIG. 4 shows a process procedure of charging control when driving battery 70 is charged with electric power (more particularly, DC power) supplied from DC charging stand 120. The process shown in FIG. 4 includes steps S21 to S27 (hereinafter, simply referred to as "S21" to "S27"). In the following, description of the points in common with the charging control in power feeding in accordance with the AC method (see FIG. 3) will not be repeated or will be simplified.

Referring to FIG. 4 together with FIGS. 1 and 2, in S21, controller 41 of communication ECU 40 controls wired communication module 43 to thereby establish connection of communication between DC charging stand 120 and communication ECU 40 (more particularly, CPLT communication and PLC communication by charging cable 121). As a result, the communication between DC charging stand 120 and communication ECU 40 (and further, integrated ECU 50) becomes possible.

Then, integrated ECU 50 receives information indicating the power feeding method from DC charging stand 120. Based on the information received from DC charging stand 120, power feeding method determination unit 55 of integrated ECU 50 determines that the power feeding method is the DC method (S22). In S23, DC charging control unit 52 corresponding to the power feeding method determined by power feeding method determination unit 55 determines whether or not the prescribed charging condition is satisfied. When DC charging control unit 52 determines that the charging condition is satisfied, power supply control unit 54 turns on switch 22a to thereby power on DC charger 20 (bring DC charger 20 into a conducting state) (S24). Then, DC charger 20 turns on the charging relay (not shown) of driving battery 70 and executes charging of driving battery 70 (S25). More specifically, controller 21 of DC charger 20 controls DC charging circuit 23 in accordance with the instruction from integrated ECU 50. DC charging circuit 23 receives the DC power supplied from DC charging stand 120 and performs prescribed power conversion. In the present embodiment, DC charging circuit 23 performs filtering (e.g., noise removal) of the received DC power, and outputs the filtered DC power to driving battery 70. As a result, driving battery 70 is charged.

When the prescribed completion condition is satisfied and charging in S25 ends, controller 41 of communication ECU 40 controls wired communication module 43 to thereby disconnect the communication with DC charging stand 120 (S26). Then, power supply control unit 54 turns off switch 22a to thereby power off DC charger 20 (bring DC charger 20 into a non-conducting state) (S27). Thereafter, DC charging control unit 52 turns off the charging relay (not shown) of driving battery 70 and ends the charging control of driving battery 70.

FIG. 5 shows a process procedure of charging control when driving battery 70 is charged with electric power (more particularly, AC power) supplied from WPT charging stand 130. The process shown in FIG. 5 includes steps S31 to S37 (hereinafter, simply referred to as "S31" to "S37"). In the following, description of the points in common with the charging control in power feeding in accordance with the AC method (see FIG. 3) will not be repeated or will be simplified.

Referring to FIG. 5 together with FIGS. 1 and 2, prior to the start of power feeding, the user (e.g., the driver of the vehicle) starts approaching a parking space (more particularly, a charging position in the parking space) where power transmission device 132 of WPT charging stand 130 is placed. When the vehicle comes close to the charging position and the vehicle speed decreases, controller 41 of communication ECU 40 controls wireless communication module 44 to thereby establish connection of communication (more particularly, wireless communication by WiFi (registered trademark)) between WPT charging stand 130 and communication ECU 40 (S31). As a result, the communication between WPT charging stand 130 and communication ECU 40 (and further, integrated ECU 50) becomes possible.

Then, integrated ECU 50 receives information indicating the power feeding method from WPT charging stand 130. Based on the information received from WPT charging stand 130, power feeding method determination unit 55 of integrated ECU 50 determines that the power feeding method is the WPT method (S32).

Then, WPT charging control unit 53 corresponding to the power feeding method determined by power feeding method determination unit 55 determines whether or not the prescribed charging condition is satisfied (S33). The charging condition can be arbitrarily set. For example, the charging condition may be satisfied when alignment between the power transmission coil and the power reception coil is completed and there is no foreign object between the power transmission coil and the power reception coil. The vehicle can prepare for charging (e.g., alignment between the power transmission coil and the power reception coil, and detection of a foreign object between the power transmission coil and the power reception coil), while performing wireless communication with WPT charging stand 130.

When WPT charging control unit 53 determines that the charging condition is satisfied, power supply control unit 54 turns on switch 32a to thereby power on WPT charger 30 (bring WPT charger 30 into a conducting state) (S34). Then, WPT charger 30 turns on the charging relay (not shown) of driving battery 70 and executes charging of driving battery 70 (S35). More specifically, controller 31 of WPT charger 30 controls power reception device 33 in accordance with the instruction from integrated ECU 50. Power reception device 33 wirelessly receives, at the power reception coil, AC power supplied from power transmission device 132 of WPT charging stand 130 and performs prescribed power conversion. The power reception coil of power reception device 33 wirelessly receives electric power transmitted from the power transmission coil of power transmission device 132. As a result, the electric power is wirelessly transferred from the power transmission coil of power transmission device 132 to the power reception coil of power reception device 33 through a magnetic field. Examples of the wireless power transfer method include a magnetic resonance method. In the magnetic resonance method, a Q value indicating the resonance intensity of a resonance circuit is may not be less than 100. However, the wireless power transfer method is not limited to the magnetic resonance method and other methods (e.g., an electromagnetic induction method) may be used. Power reception device 33 also performs filtering (e.g., noise removal) and rectification of the received AC power, and outputs the obtained DC power to driving battery 70. As a result, driving battery 70 is charged.

When the prescribed completion condition is satisfied and charging in S35 ends, controller 41 of communication ECU 40 controls wireless communication module 44 to thereby disconnect the communication with WPT charging stand 130 (S36). Then, power supply control unit 54 turns off switch 32a to thereby power off WPT charger 30 (bring WPT charger 30 into a non-conducting state) (S37). Thereafter, WPT charging control unit 53 turns off the charging relay (not shown) of driving battery 70 and ends the charging control of driving battery 70.

As described above, in the vehicle-mountable control system according to the present embodiment, when the charging control is not executed, integrated ECU 50 powers off all of the three types of chargers (AC charger 10, DC charger 20 and WPT charger 30) (brings all of the three types of chargers into a non-conducting state) (FIG. 3: S17, FIG. 4: S27, FIG. 5: S37). When the charging control is executed by the electric power supplied in accordance with the prescribed power feeding method (FIG. 3: AC method, FIG. 4: DC method, FIG. 5: WPT method), integrated ECU 50 powers on the charger (FIG. 3: AC charger 10, FIG. 4: DC charger 20, FIG. 5: WPT charger 30) corresponding to the prescribed power feeding method (brings the charger corresponding to the prescribed power feeding method into a conducting state), with the chargers not corresponding to the prescribed power feeding method being maintained off (FIG. 3: S14, FIG. 4: S24, FIG. 5: S34). According to such a configuration, all of the chargers are powered off when the charging control is not executed, and the unused chargers are selectively powered off (brought into a non-conducting state) when the charging control is executed. As a result, power consumption in the vehicle-mounted controllers can be reduced and the unauthorized information is less likely to enter the vehicle due to communication with the charging stand.

In each charging control described above, during a period from establishment of connection of communication (FIG. 3: S11, FIG. 4: S21, FIG. 5: S31) to disconnection of the communication (FIG. 3: S16, FIG. 4: S26, FIG. 5: S36), the information is exchanged between the vehicle and the charging stand (i.e., the charging facility external to the vehicle). For example, the transmission power of the charging stand, a state of the charging sequence on the charging stand side, the presence or absence of an abnormality in the charging stand, and the like are transmitted from the charging stand to the vehicle. In addition, the reception power of the vehicle, a state of the charging sequence on the vehicle side, the presence or absence of an abnormality in the vehicle, and the like are transmitted from the vehicle to the charging stand. When unauthorized communication (e.g., unauthorized access) with the vehicle is performed during exchange of the information between the vehicle and the charging stand, the unauthorized information may enter the vehicle. In the vehicle-mountable control system according to the present embodiment, communication monitoring unit 56 of integrated ECU 50 and controller 41 of communication ECU 40 are configured to monitor the presence or absence of the unauthorized communication, and perform the prescribed process when the unauthorized communication is detected.

Figure 6:
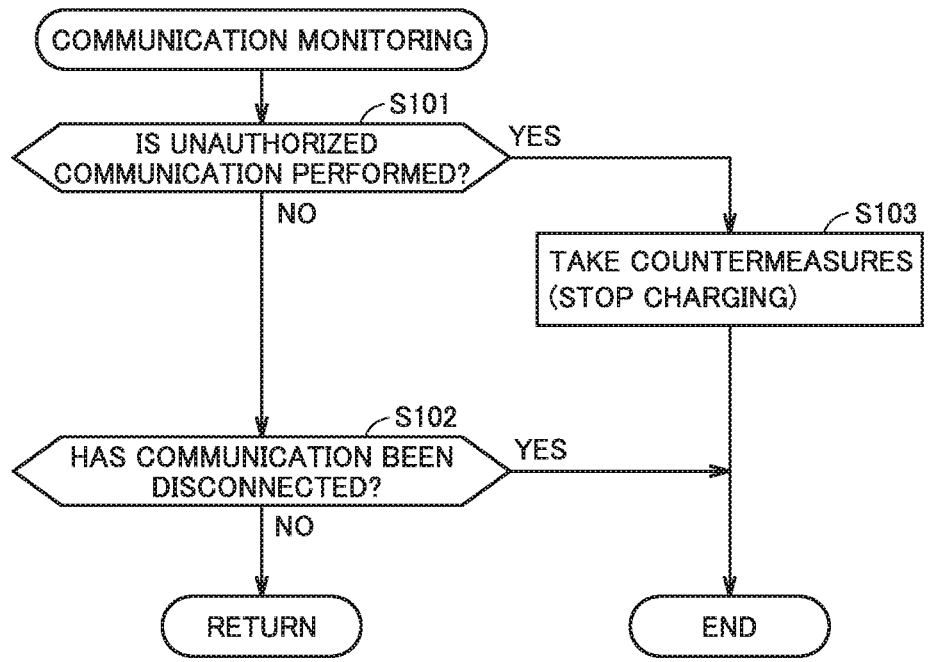
FIG. 6 is a flowchart showing a process procedure performed when each of a communication ECU and an integrated ECU shown in FIG. 1 monitors communication.

FIG. 6 is a flowchart showing a process procedure performed when each of communication monitoring unit 56 of integrated ECU 50 and controller 41 of communication ECU 40 monitors communication. The process shown in FIG. 6 includes steps S101 to S103 (hereinafter, simply referred to as "S101" to "S103"), and is started when connection of the communication between the vehicle and the charging stand is established in each charging control described above (see FIGS. 3 to 5).

Referring to FIG. 6, in S101, it is determined whether or not unauthorized communication is performed within a monitoring range of each of integrated ECU 50 and communication ECU 40. For example, each of integrated ECU 50 and communication ECU 40 uses the firewall function to check the presence or absence of unauthorized communication in its transmission and reception, and uses the error detection function of CAN communication to check the presence or absence of unauthorized communication in local bus B1. Examples of the unauthorized communication include unauthorized access (e.g., spoofing), falsification of data or a program, DoS attack (Denial of Service attack), and DDoS attack (Distributed Denial of Service attack).

When it is determined in S101 that the unauthorized communication is not performed (NO in S101), it is determined in S102 whether or not the communication between the vehicle and the charging stand has been disconnected. When the communication has not been disconnected (NO in S102), the process returns to S101. When the communication has been disconnected (YES in S102), the series of process in FIG. 6 ends.

When it is determined in S101 that the unauthorized communication is performed (YES in S101), charging in execution is stopped and the prescribed process (more particularly, countermeasures against the unauthorized communication) is performed in S103. For example, at least one of powering off communication ECU 40, prohibiting communication through local bus B1, and reprogramming a falsified program (e.g., program of communication ECU 40) is performed as the prescribed process. In the present embodiment, integrated ECU 50 and the power supply switch (switch 42a) of communication ECU 40 are connected through the direct line, and thus, communication ECU 40 can be quickly powered off when integrated ECU 50 detects the unauthorized communication. As to prohibiting communication through local bus B1, local bus B1 may be shut down to become unavailable, or an instruction to prohibit communication through local bus B1 may be transmitted to each controller connected to local bus B1. The prescribed process performed in S103 is not limited to the foregoing and can be changed as appropriate.

When S103 is performed, the series of process in FIG. 6 ends. The above-described series of process in FIG. 6 is performed separately and in parallel in integrated ECU 50 and communication ECU 40. When the unauthorized communication is detected in at least one of integrated ECU 50 and communication ECU 40 (YES in S101), the countermeasures are taken in S103. As described above, the multilayer protection against the unauthorized communication is performed in communication ECU 40 and integrated ECU 50. Therefore, even if the unauthorized communication is not detected in communication ECU 40, the unauthorized communication is detected in integrated ECU 50, and thus, the countermeasures against the unauthorized communication can be taken.

The above-described embodiment describes the vehicle-mountable control system in which the vehicle-mounted battery can be charged in accordance with the three types of power feeding methods. In the vehicle-mountable control system according to the above-described embodiment, communication with the charging stands (i.e., AC charging stand 110, DC charging stand 120 and WPT charging stand 130) corresponding to the three-types of power feeding methods is performed by communication ECU 40. However, the present disclosure is not limited to the foregoing, and both of communication ECU 40 and integrated ECU 50 may be configured to communicate with the charging stands (charging facilities external to the vehicle).

Figure 7:
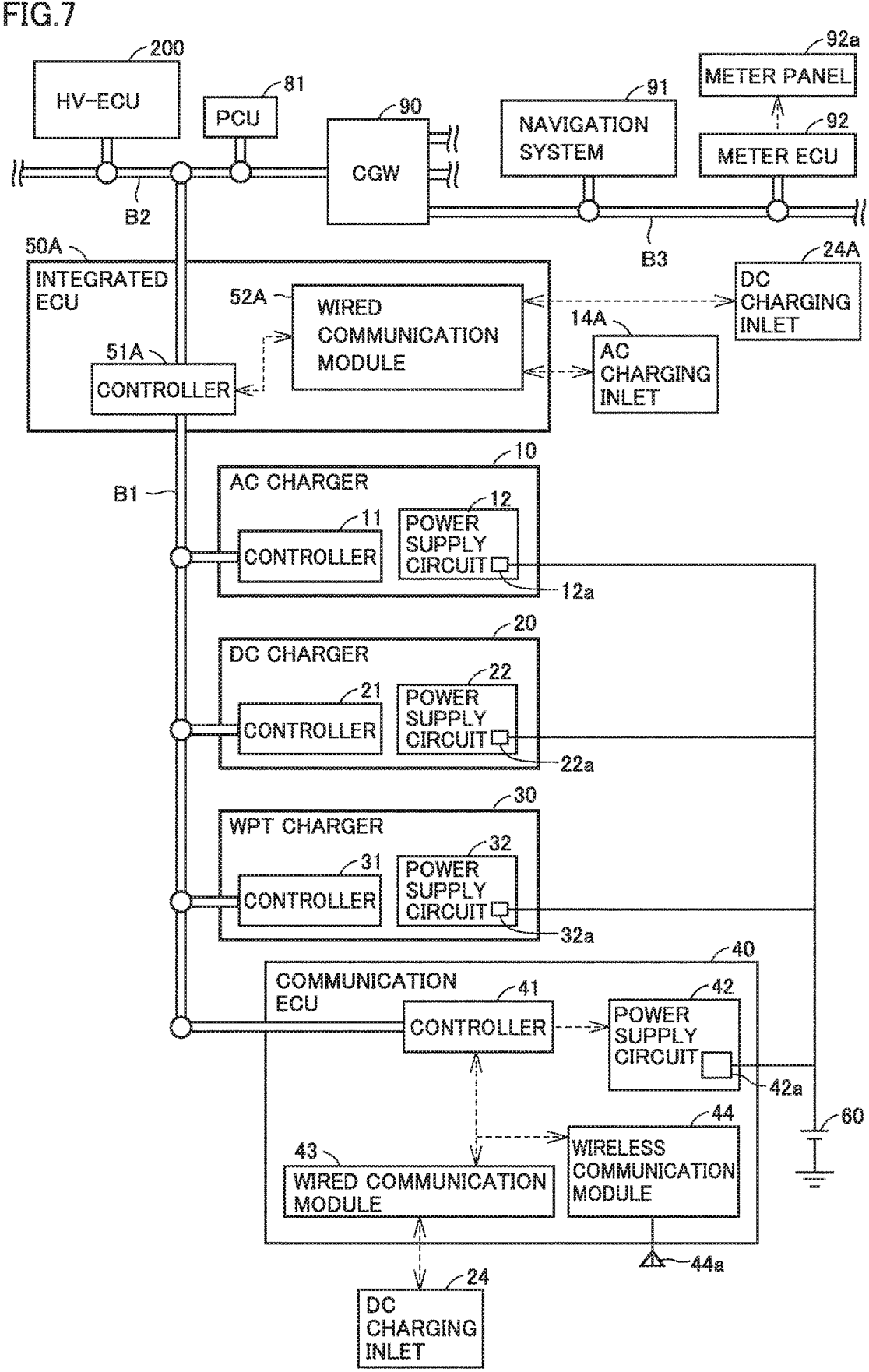
FIG. 7 shows a modification of the configuration of the vehicle-mountable control system shown in FIGS. 1 and 2.

FIG. 7 shows a modification of the configuration of the vehicle-mountable control system shown in FIGS. 1 and 2. As to the vehicle-mountable control system according to the present modification, differences from the vehicle-mountable control system shown in FIGS. 1 and 2 will be mainly described and description of the common components will not be repeated.

Referring to FIG. 7 together with FIGS. 1 and 2, the vehicle-mountable control system according to the present modification includes an integrated ECU 50A instead of above-described integrated ECU 50 (FIGS. 1 and 2). In addition, the vehicle-mountable control system includes an AC charging inlet 14A instead of AC charging inlet 14 (FIGS. 1 and 2), and further includes a DC charging inlet 24A in addition to DC charging inlet 24 (FIGS. 1 and 2), and is configured to charge the vehicle-mounted battery (e.g., driving battery 70 shown in FIG. 2) in accordance with four types of power feeding methods.

AC charging inlet 14A is an inlet connected to a charging connector of a charging cable of a normal charger that employs special protocol-based wired communication (e.g., PWM communication). DC charging inlet 24 is an inlet connected to a charging connector of a charging cable corresponding to a power feeding method (e.g., the CCS method) that employs TCP/IP protocol-based communication which is the general-purpose IT technology. DC charging inlet 24A is an inlet connected to a charging connector of a charging cable corresponding to a power feeding method (e.g., the CHAdeMo method or the GB/T method) that employs CAN communication. Description will be given below of the example in which the power feeding method that employs CAN communication is the CHAdeMO method. However, the GB/T method may be used instead of the CHAdeMO method.

When the charging connector of the charging cable of the normal charger is connected to AC charging inlet 14A, a power line of the charging cable is connected to AC charging circuit 13 (FIG. 2) of AC charger 10, and a signal line of the charging cable is connected to a wired communication module 52A of integrated ECU 50A. AC charger 10 (particularly, AC charging circuit 13) is configured to perform power conversion (e.g., filtering for obtaining a desired power waveform) corresponding to the AC method, and corresponds to one example of "first charger" according to the present disclosure. When the charging connector of the charging cable corresponding to the CCS method is connected to DC charging inlet 24, a power line of the charging cable is connected to DC charging circuit 23 (FIG. 2) of DC charger 20, and a signal line of the charging cable is connected to wired communication module 43 of communication ECU 40. When the charging connector of the charging cable corresponding to the CHAdeMO method is connected to DC charging inlet 24A, a power line of the charging cable is connected to DC charging circuit 23 (FIG. 2) of DC charger 20, and a signal line of the charging cable is connected to wired communication module 52A of integrated ECU 50A.

Integrated ECU 50A includes a controller 51A configured similarly to integrated ECU 50 (FIG. 2), and wired communication module 52A. Wired communication module 52A is controlled by controller 51A, and communicates with the outside of the vehicle and outputs a signal received from outside the vehicle to controller 51A. Wired communication module 52A is configured to include a CAN controller and a CPLT circuit (both are not shown). The CAN controller is configured to perform CAN communication with a prescribed charging stand (e.g., a charging stand corresponding to the CHAdeMO method) through the signal line housed in the charging cable. When the charging connector of the charging cable connected to the charging stand corresponding to the CHAdeMO method is connected to DC charging inlet 24A, CAN communication between the vehicle and the charging stand corresponding to the CHAdeMO method becomes possible. The CPLT circuit is configured to perform CPLT communication with a prescribed charging stand (e.g., the normal charger) through the signal line housed in the charging cable. When the charging connector of the charging cable connected to the normal charger is connected to AC charging inlet 14A, CPLT communication between the vehicle and the normal charger becomes possible. In the present modification, integrated ECU 50A is configured to perform wired communication with the normal charger (i.e., the charging facility for the AC power wired power feeding method provided outside the vehicle).

Wireless communication module 44 of communication ECU 40 is configured to perform wireless communication with the charging stand (e.g., the WPT charging stand) corresponding to the power feeding method that employs wireless communication (e.g., wireless communication by WiFi (registered trademark)). WPT charger 30 is configured to include power reception device 33 (FIG. 2) and perform wireless power reception and power conversion (e.g., filtering for obtaining a desired power waveform) corresponding to the WPT method. In the present modification, communication ECU 40 is configured to wirelessly communicate with the WPT charging stand (i.e., the charging facility for the wireless power feeding method provided outside the vehicle). WPT charger 30 according to the present modification corresponds to one example of "second charger" according to the present disclosure.

When comparing the communications in the respective power feeding methods, the special protocol-based wired communication employed in the normal charger and the CAN communication employed in the CHAdeMO method and the GB/T method are lower in information security risk than the TCP/IP protocol-based communication employed in the CCS method and the wireless communication employed in the WPT method. In the above-described vehicle-mountable control system according to the modification, the TCP/IP protocol-based communication and the wireless communication that are higher in information security risk are performed by the controller that is not directly connected to HV-ECU 200 (i.e., communication ECU 40 separated from HV-ECU 200). Therefore, even if the unauthorized information enters the vehicle from outside the vehicle during communication, the unauthorized access to HV-ECU 200 caused by the unauthorized information is less likely to occur. In addition, in the above-described vehicle-mountable control system, the special protocol-based wired communication and the CAN communication that are lower in information security risk are performed by integrated ECU 50A. As a result, the communication modules (e.g., four types of communication modules) for the respective communication methods used in the respective power feeding methods can be mounted separately in integrated ECU 50A and communication ECU 40, and thus, the space for mounting the communication modules is easily ensured.

The above-described embodiment describes the vehicle-mountable control system in which the vehicle-mounted battery can be charged in accordance with the three types of power feeding methods (see FIGS. 1 and 2). The modification shown in FIG. 7 describes the vehicle-mountable control system in which the vehicle-mounted battery can be charged in accordance with the four types of power feeding methods. However, the vehicle-mountable control system may only be configured such that the vehicle-mounted battery can be charged in accordance with a plurality of types of power feeding methods. For example, the vehicle-mountable control system may be configured such that the vehicle-mounted battery can be charged in accordance with five or more types of power feeding methods.

Although the HV-ECU is used as the traveling controller in the above-described embodiment and modification, the present disclosure is not limited thereto, and the traveling controller may be any component as long as it executes the traveling control (control of traveling/cornering/stopping). For example, the traveling controller may be an engine ECU, or may be a steering ECU (e.g., a motor ECU for electric power steering), or may be a brake ECU.

In addition, power conversion performed in each of AC charging circuit 13, DC charging circuit 23 and power reception device 33 can be changed as appropriate. For example, at least one of AC charging circuit 13, DC charging circuit 23 and power reception device 33 may be configured to include a DC/DC converter and perform transformation as the power conversion. In addition, security measures software and/or hardware may be provided in controllers 11, 21, 31, and 41.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle-mountable control system comprising:
   a traveling controller configured to execute traveling control of a vehicle; and
   a charging control device configured to be supplied with electric power in accordance with a plurality of types of power feeding methods and execute charging control of a vehicle-mounted battery,
   the charging control device including:
   a plurality of chargers corresponding to the respective power feeding methods;
   a charging communication device configured to communicate with a charging facility external to the vehicle; and
   an integrated controller configured to communicate with each of the plurality of chargers and the charging communication device,
   the charging facility being configured to supply electric power to the vehicle-mounted battery through a charger corresponding to a power feeding method of the charging facility,
   the plurality of chargers, the charging communication device and the integrated controller being connected to one another through a first communication line used only for the charging control,
   of the plurality of chargers, the charging communication device and the integrated controller, only the integrated controller being connected to a second communication line to which the traveling controller is connected, and
   each of the charging communication device and the integrated controller is configured to monitor presence or absence of unauthorized communication, and perform a prescribed process when the unauthorized communication is detected.

2. The vehicle-mountable control system according to claim 1, wherein
   the prescribed process is at least one of powering off the charging communication device, prohibiting communication through the first communication line, and reprogramming a falsified program.

3. The vehicle-mountable control system according to claim 1, wherein
   the integrated controller is configured to control the plurality of chargers to be individually powered on and off,
   when the charging control is not executed, the integrated controller is configured to power off all of the plurality of chargers, and when the charging control is executed using electric power supplied in accordance with a prescribed power feeding method, the integrated controller is configured to power on the charger corresponding to the prescribed power feeding method, with the plurality of chargers not corresponding to the prescribed power feeding method being maintained off.

4. The vehicle-mountable control system according to claim 1, further comprising
a display controller configured to control a display device, the display controller being connected to the integrated controller through the second communication line,
the integrated controller being configured to transmit display information to the display controller, but not transmit information other than a request signal to the traveling controller.

5. The vehicle-mountable control system according to claim 1, wherein
the plurality of chargers include a first charger configured to perform power conversion corresponding to a wired power feeding method, and a second charger configured to perform wireless power reception and power conversion corresponding to a wireless power feeding method,
the integrated controller is configured to wiredly communicate with a charging facility for the wired power feeding method provided outside the vehicle, and
the charging communication device is configured to wirelessly communicate with a charging facility for the wireless power feeding method provided outside the vehicle.

6. The vehicle-mountable control system according to claim 1, further comprising
a plurality of global buses communicatively connected to one another via a gateway device, wherein
the first communication line is a local bus communicatively connecting prescribed controllers included in the charging control device, and not connected to the gateway device and the plurality of global buses, and
the second communication line is a global bus connected to the gateway device.

7. A vehicle comprising:
the vehicle-mountable control system as recited in claim 1;
the vehicle-mounted battery configured to be charging-controlled by the charging control device of the vehicle-mountable control system; and
a travel driving device configured to be controlled by the traveling controller of the vehicle-mountable control system and cause the vehicle to travel using electric power stored in the vehicle-mounted battery.

* * * * *